United States Patent [19]

Goodard

[11] Patent Number: 4,666,122
[45] Date of Patent: May 19, 1987

[54] ALTERNATOR MOUNTING ASSEMBLY
[75] Inventor: Earl F. Goodard, Marmion, Australia
[73] Assignee: Ayr Pty. Ltd., East Victoria Park, Australia
[21] Appl. No.: 719,516
[22] PCT Filed: Aug. 10, 1984
[86] PCT No: PCT/AU84/00157
§371 Date: Mar. 22, 1985
§102(e) Date: Mar. 22, 1985
[87] PCT Pub. No: WO 85/00936
PCT Pub. Date: Feb. 28, 1985
[30] Foreign Application Priority Data
Aug. 10, 1983 [AU] Australia .............................. PG0754
[51] Int. Cl.$^4$ ............................................. F16M 3/00
[52] U.S. Cl. ....................................... 248/666; 248/670; 248/675
[58] Field of Search ............... 248/666, 664, 668, 670, 248/673, 675, 676

[56] References Cited
U.S. PATENT DOCUMENTS
2,925,740  2/1960  Chung ............................ 248/666 X
3,027,736  4/1962  Smith ............................. 248/666 X
4,344,596  8/1982  Hjaeresen ....................... 248/666 X FOREIGN PATENT DOCUMENTS
0514035  6/1955  Canada ................................ 248/670

Primary Examiner—Ramon O. Ramirez
Attorney, Agent, or Firm—Harness, Dickey & Pierce

[57] ABSTRACT

A mounting assembly particularly adapted for mounting a replacement alternator of the type having a pair of lower mounting lugs onto a pair of spaced mounting lugs of an engine block. The mounting assembly comprises two portions one adapted for connection to the alternator, and the other having a pair of brackets to provide fixture to the mounting lugs of the engine. The spacing between the brackets is adjustable by means of slidable arms to facilitate attachment of the assembly to various spacings of mounting lugs. The assembly can also provide pivotal movement between the alternator and engine by adjustment of the one portion.

21 Claims, 7 Drawing Figures

ALTERNATOR MOUNTING ASSEMBLY

This invention relates to a mounting assembly for mounting alternators or generators (hereinafter referred to as "alternators") onto machines such as internal combustion engines. The invention is particularly suitable for mounting alternators onto engines of motor vehicles.

Alternators for engines of motor vehicles comprise a metal casing having upper and lower mounts for mounting the alternators onto the engines. Typically, the lower mount is in one of two forms; one form being a pair of mounting brackets adapted to be bolted onto a corresponding pair of mounting lugs on the engine, and the other form being a single mounting bracket (commonly referred to as a "foot") adapted to be received between a pair of mounting lugs on the engine and secured thereto by a central mounting bolt.

The spacing between alternator mounting lugs on motor vehicle engines generally vary between vehicle manufacturers and because of this and of the two types of lower mounts for alternators, it is necessary for alternator manufacturers to produce a wide range of alternators to cater for all requirements. This in turn requires that alternator distributors and suppliers carry a relatively large inventory, thereby leading to increased costs.

It is an object of this invention to overcome the abovementioned problem by providing a mounting assembly whereby one particular alternator of the type having a pair of lower mounting brackets (as opposed to a mounting foot) may be mounted onto a range of motor vehicles which do not have a common spacing between the alternator mounting lugs on their respective engines.

In one form the invention resides in a mounting assembly for connecting two components together, said assembly comprising a first and second portion, said first portion adapted to be mounted to one component, and said second portion having a pair of brackets, the said portions being adapted for fixing together, the brackets of said second portion being adjustably mounted relative to each other to vary the spacing therebetween and said brackets are adapted to be engaged with a pair of spaced mounting lugs on the other component.

According to a preferred feature of the invention, a bracket is further adapted for selective positioning with respect to the first portion.

According to another preferred feature, the first portion includes a spacing means receivable between a pair of mounting lugs located on said one component.

According to another preferred feature, the spacing means is a spindle adapted for securement between said mounting lugs.

According to another preferred feature, the spindle has an axial hole at each end thereof, the holes having threaded formations of opposite hand therein, each threaded hole being adapted to receive a respective bolt for securement to said mounting lugs, whereby the opposed threaded formations are of the appropriate hand to resist loosening of the bolts upon connection of said components.

According to another preferred feature, the second portion includes an elongate arm of arcuate transverse section, whereby a bracket is fixed to said arm and extends outwardly therefrom.

According to another preferred feature, the arm is adapted to be fixed relative to said first portion, the concave portion of said arm having a greater curvature than the adjacent portion of said first portion.

According to another preferred feature, the brackets are provided with an aperture to be aligned with corresponding apertures disposed within the said spaced mounting lugs of the other component, thereby facilitating mounting thereto by further bolting means.

According to another preferred feature, the brackets are provided with a spacing means receivable therebetween when said brackets are positioned in alignment with said mounting lugs, the spacing means having a central axial hole therein to receive a central bolt which passes through each of the respective apertures of the brackets and mounting lugs, securing them together.

Preferably, cases where the mounting lugs in the machine are of a type adapted to receive an alternator having a pair of lower mounting brackets, said two mounting brackets may be mounted directly onto the mounting lugs using mounting bolts. In other cases where the mounting lugs are of a type adapted to receive an alternator having a mounting foot, a tubular member may be fitted between the brackets with the central passage of the tubular member aligned with the mounting apertures in the brackets, the length of the tubular member being such that the spacing between the outer faces of the two brackets is equal to the length of the foot.

The invention will be better understood by reference to the following description of one specific embodiment thereof, as shown in the accompanying drawings wherein.

Figure 1:
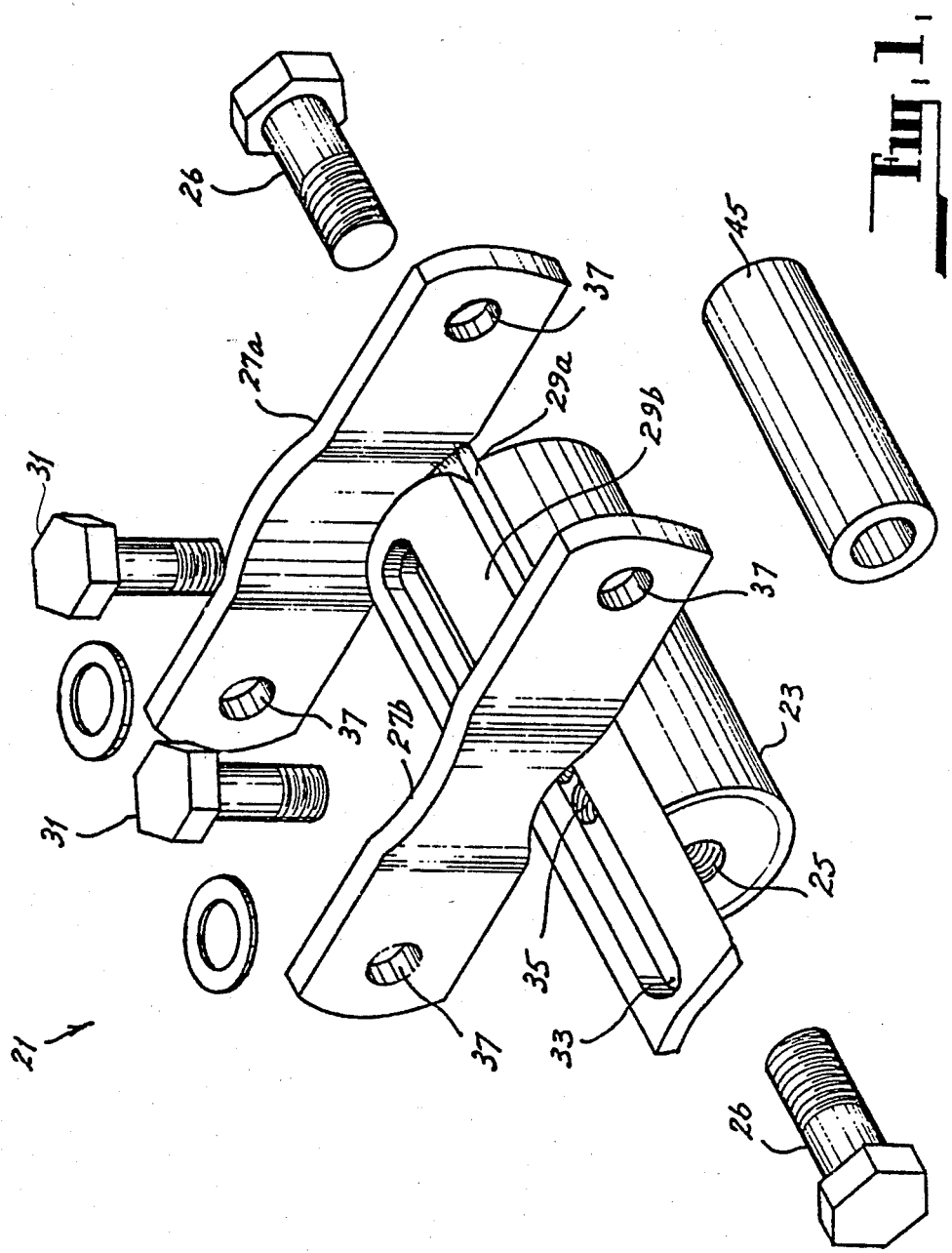
FIG. 1 is an exploded view of a mounting assembly according to the embodiment.
Figure 2:
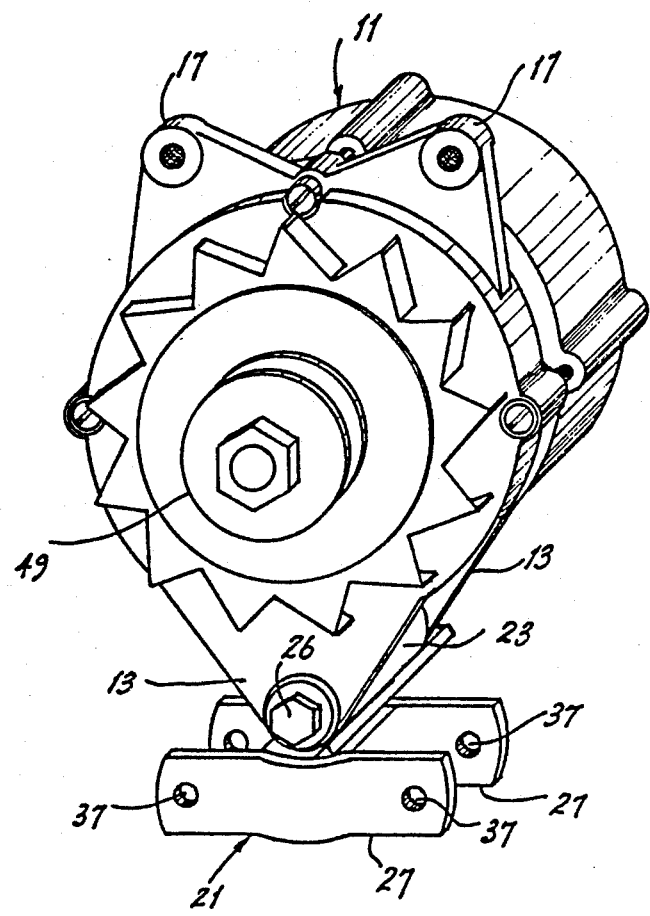
FIG. 2 is a perspective view of an alternator of the type having a pair of lower mounting brackets, with the mounting assembly shown secured thereto.

Referring to the drawings, there is shown a motor vehicle alternator 11 of the type having a pair of lower mounting brackets 13. The lower mounting brackets 13 having mounting apertures to receive mounting bolts. The alternator illustrated in the drawings also has a pair of upper mounting brackets 17. In the majority of cases, motor vehicle alternators have only one upper mounting bracket; the provision of two such brackets permits the alternator to be mounted onto either side of the motor vehicle engine.

A mounting assembly 21 is provided for mounting the alternator 11 onto a range of motor vehicle engines regardless of the spacing between the alternator mounting lugs on the engine or whether the alternator mounting lugs are adapted to receive an alternator of the type having a pair of lower mounting brackets or an alternator of the type having a so-called mounting foot.

The mounting assembly 21 comprises a cylindrical spindle 23 having axial holes 25 formed in its ends. The holes 25 are internally threaded, one hole having a thread of right hand formation and the other hole having a thread of left hand formation; the purpose of the opposed threads will become apparent later. The spindle 23 is adapted to be received between the lower mounting brackets 13 with the holes 25 aligned with the mounting apertures in the brackets 13 to receive mounting bolts 26. The mounted bolts 26 of course have opposed threads to permit engagement with the respective threaded holes 25.

There is provided a pair of transverse brackets 27 mounted on the spindle 23. More particularly, each bracket 27 is secured to a respective clamping plate 29 which is adjustably mounted on the spindle. The clamping plate 29a carrying the bracket 27a bears against the spindle and the clamping plate 29b carrying the other bracket 27b overlies the clamping plate 29a. The clamping plates 29a and 29b are shaped in cross-section to partially envelop the spindle (as best seen in FIG. 1 of the drawings). More particularly, the clamping plates 29 are arcuate in cross-section and the respective radius of curvature of each plate is less than the radius of the cylindrical spindle. The effect of this is that when the clamping plates 29 are pressed inwardly by a pair of retaining bolts 31, the inner plate 29a deflects and "bites" against the spindle, thereby increasing frictional engagement between the plates 29 and the spindle. The clamping plates are retaining in position by the pair of retaining bolts 31 each of which extends through an elongated slot 33 in each clamping plate and threadedly engages one of a series of threaded holes 35 spaced longitudinally along the spindle 23. This arrangement allows the two clamping plates to be moved axially relative to the spindle to permit adjustment of the positions of the brackets relative to the spindle and adjustment of the spacing between the brackets. The retaining bolts 31 are used to lock the clamping plates 29 against movement relative to the spindle once the brackets 27 are in the desired position. The series of longitudinally spaced threaded holes 35 allows the two retaining bolts 31 to be fitted irrespective of the position of each bracket 26 within the range of adjustment for which it is designed.

Each transverse bracket 27 is secured to its respective clamping plate 29 at a point intermediate its length and its free ends are provided with mounting apertures 37. The provision of mounting apertures at both ends of the brackets 27 enables the mounting assembly to be mounted onto either side of a motor vehicle engine; the side of mounting is dependent on the particular side on which the engine is designed to receive the alternator.

In fitting an alternator which is of the type described and which is not designed to fit directly onto the alternator mounting lugs provided on motor vehicle engine, the spindle 23 is firstly mounted to the lower mounting brackets 13 of the alternator in the manner described previously. In doing this, the conventional stress relieving bush 39 is retained.

In mounting the spindle onto the mounting brackets 13, the spindle is orientated such that the threaded hole 25 in the end thereof, which is to be bolted to that mounting bracket 13a not fitted with the stress relieving bush 39, has a thread formation of a hand which would effect tightening of the mounting bolt 26 received therein on inward pivotal movement of the alternator under the action of a force arising from tension on the fan belt. In other words, interaction between the particular threaded hole 25 and the respective mounting bolt 26 produces a locking action which resists inward pivotal movement of the alternator. Whether the spindle is orientated such that the hole having the right hand thread formation or the hole having the left hand thread formation is located adjacent the mounting bracket 13a would depend on the particular side of the engine on which the alternator is to be mounted. The mounting bolts 26 are not fully tightened initially so as to permit limited rotational movement of the spindle about its central axis. The clamping plates are then adjusted so that the position of the transverse brackets 27 correspond approximately to their required position relative to the pulley on the alternator and the alternator mounting lugs on the engine.

Figure 3:
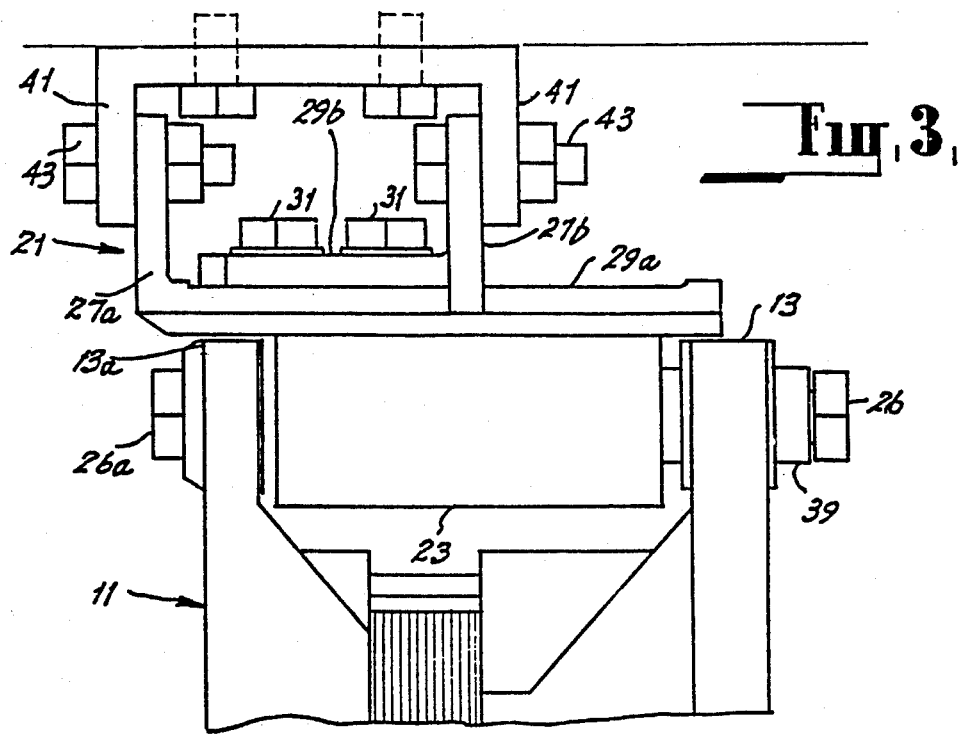
FIG. 3 is a plan view showing the mounting assembly mounting the alternator onto alternator mounting lugs of the type adapted to normally receive an alternator having a pair of lower mounting brackets.

Referring now to FIG. 3 of the drawings, there is shown a pair of alternator mounting lugs 41 of the type adapted to normally receive an alternator of the type having a pair of lower mounting brackets. In this case the appropriate end of each transverse bracket 27 is secured to a respective one of the mounting lugs 41 by means of a fixing bolt 43.

Figure 4:
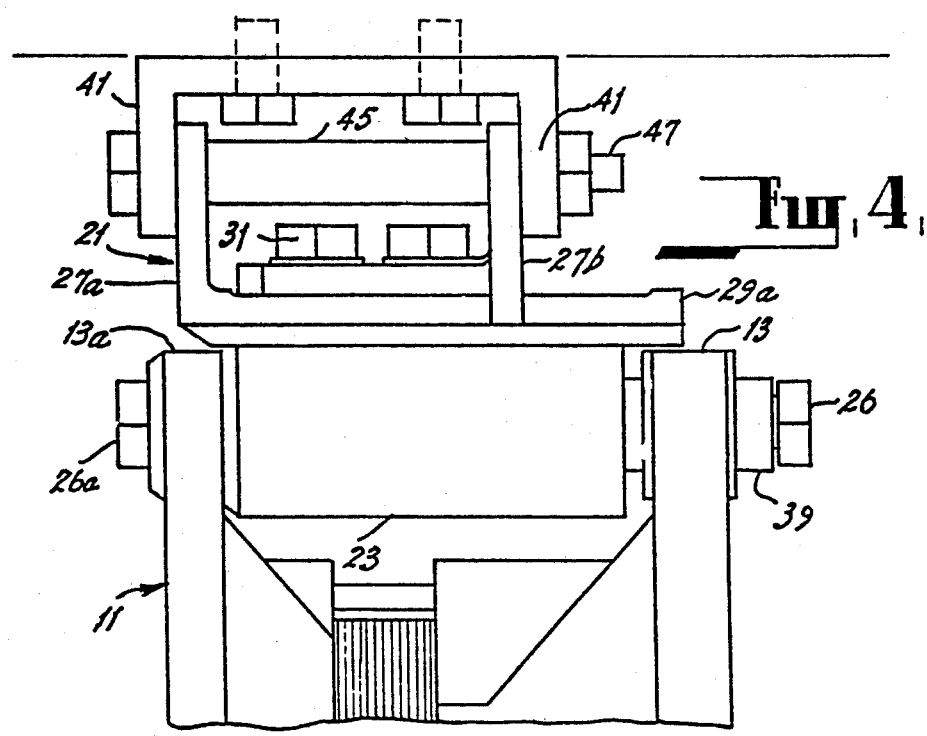
FIG. 4 is a plan view showing the mounting assembly mounting the alternator onto alternator mounting lugs of the type adapted to normally receive an alternator having a mounting foot.

Referring now to FIG. 4 of the drawings, there is shown a pair of alternator mounting lugs 41 of the type adapted to normally receive an alternator having a mounting foot. In this case, a tubular member 45 is fitted between the brackets 27 with the central passage of the tubular member aligned with the mounting apertures 37 at the one end of each bracket, the tubular member having been cut to a length whereby with the tubular member in position the distance between the outer faces of the two brackets is equal to the length of the mounting foot of an alternator normally fitted to the mounting lugs. The brackets 27 are secured to the mounting lugs 41 by means of a central bolt 47. Once the brackets 27 have been secured to the alternator mounting lugs 41 (regardless of whether the lugs 41 are of the type illustrated in FIG. 3 or FIG. 4), the axial position of the alternator 11 is adjusted so that its pulley 49 is aligned with the crankshaft and water pump pullies 51 and 53 respectively of the engine. This is achieved by moving the spindle 23 relative to the clamping plates 29 until the alternator is in the desired position. The retaining bolts 31 may then be tightened so as to clamp the clamping plates 29 against movement relative to the spindle and thus lock the alternator in position.

At this stage, because the mounting bolts 26, which are threadedly engaging the spindle 23, have not been tightened, the alternator may be pivotted about the central axis of the spindle for the purpose of tensioning a fan belt 55 to be fitted around the alternator pulley 49 and the crankshaft and water pump pullies 51 and 53 respectively. Once the fan belt 55 has been fitted and tensioned, the mounting bolts 26 are tightened so as to lock the alternator in position. Any tendency of the alternator to pivot inwardly under the action of a force arising from the fan belt tension is resisted by the locking action of the front mounting bolt 26, as described previously.

Figure 6:
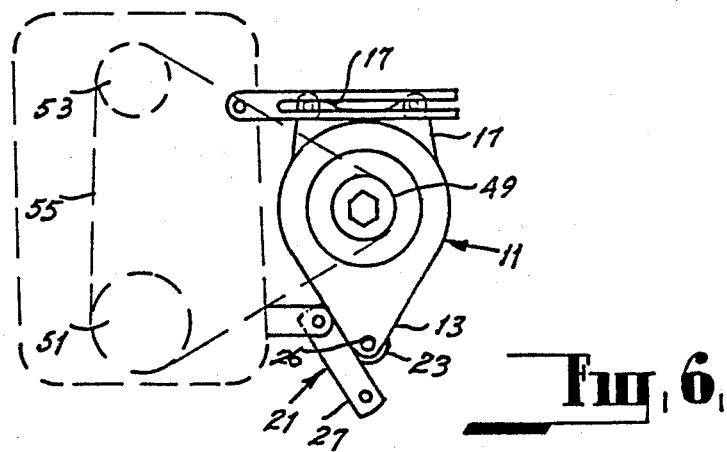
FIG. 6 is a schematic elevational view illustrating another possible position of the mounting assembly when mounting an alternator on a motor vehicle engine.
Figure 5:
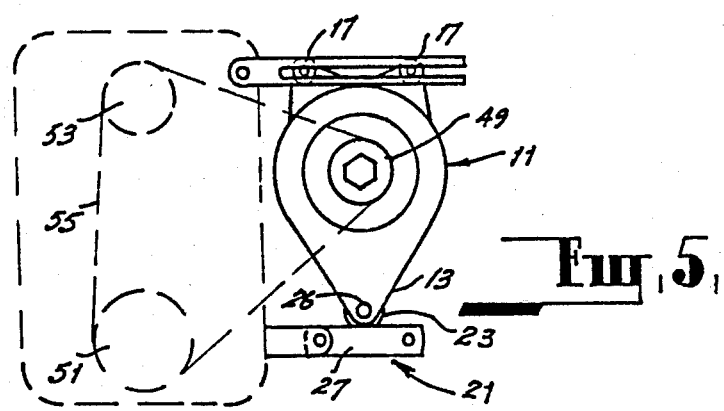
FIG. 5 is a schematic elevational view illustrating one possible position of the mounting assembly when mounting an alternator on a motor vehicle engine.
Figure 7:
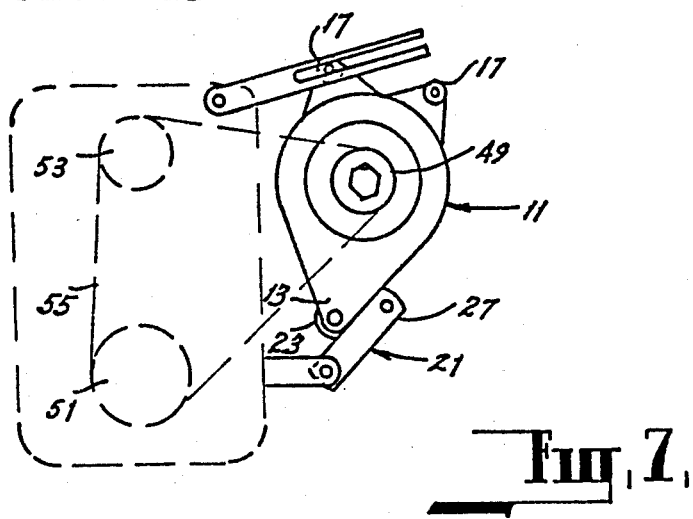
FIG. 7 is a schematic elevational view illustrating still another possible position of the mounting assembly when mounting an alternator on a motor vehicle engine.

The construction of the mounting assembly is such that it may be fitted in one of a series of possible orientations so as to permit the original fan belt 55 of the motor vehicle to most cases be retained. Referring to the drawings, FIG. 5 illustrates the brackets 27 of the mounting assembly in a central position, FIG. 6 illustrates the brackets in the lowermost position and FIG. 7 illustrates the brackets in the uppermost position. The brackets 27 are of course moved into the desired position before being tightly bolted onto the alternator mounting lugs 41 on the engine.

By selection of an appropriate orientation of the brackets 27, it is generally possible to fit the replacement alternator 11 onto the engine and retain the original fan belt of the engine.

It should be appreciated that the scope of the invention is not limited to the scope of the embodiment described. In particular, the invention is not limited to its application in mounting alternators onto the engines of motor vehicles. It may, for instance, be applied to the mounting of any device onto another device whereby spaced mounting lugs are provided on the other device.

The claims defining the invention are claimed as follows:

1. A mounting assembly for connecting two components together, said assembly comprising a first and second portion, said first portion comprising a spindle having an axial hole at each end thereof, said axial holes having threaded formations of opposite hand therein, each threaded hole being adapted to receive a respective bolt for securement to a pair of spaced mounting lugs of one of said components, whereby the opposed threaded formations are of the appropriate hand to resist loosening of the bolts upon connection of said components, and said second portion having a pair of brackets, the said portions being adapted for fixing together, the brackets of said second portion being adjustably mounted relative to each other and to said spindle to vary the spacing therebetween and said brackets are adapted to be engaged with pair of spaced mounting lugs on the other component.

2. A mounting assembly as claimed at claim 1 wherein said second portion includes a pair of elongate arms of arcuate transverse section and a bracket affixed to each said arm and extending outwardly therefrom.

3. A mounting assembly as claimed at claim 2, wherein each said arm is adapted to be fixed relative to said first portion, the concave portion of said arms having a greater curvature than the adjacent portion of said first portion.

4. A mounting assembly as claimed at claim 2 wherein the arms are disposed in a layered formation thereby defining outer and inner arms, the concave portion of said inner arm substantially engaging said first portion, and the convex portion of said inner arm substantially engaging the concave portion of said outer arm.

5. A mounting assembly as claimed at any of claims 2 to 4, wherein each said arms is provided with a centrally disposed elongate aperture, and the first portion is provided with at least one tapped hole to receive a fixing bolt, the arm being arranged to align the aperture thereof with said hole to enable said bolt to be received and secured within said hole thereby fixing the first and second portions together.

6. A mounting assembly as claimed at claim 5, whereby the spacing between the brackets is provided by sliding said arms in the longitudinal direction thereof, thereby retaining access for said fixing bolt to said hole by the provision of the elongate aperture.

7. A mounting assembly as claimed at claim 1 wherein each of the brackets is provided with an aperture to be aligned with corresponding apertures disposed within the said spaced mounting lugs of the other component, thereby facilitating mounting thereto by further bolting means.

8. A mounting assembly for connecting two components together, said assembly comprising a first and second portion, said first portion adapted to be mounted to one component, and said second portion having a pair of brackets, the said portions being adapted for fixing together, the brackets of said second portion being adjustably mounted relative to each other to vary the spacing therebetween and each of said brackets being provided with an aperture disposed to be aligned with corresponding apertures formed in a pair of spaced mounting lugs on the other component, said brackets being provided with a spacing means receivable therebetween when said brackets are positioned in alignment with said mounting lugs, the spacing means having a central axial hole therein to receive a central bolt which passes through each of the respective apertures of the brackets and mounting lugs, securing them together.

9. A mounting assembly for mounting one component having a pair of mounting lugs of one spacing onto a pair of further mounting lugs of another component having a different standard spacing, comprising a first portion having connector means to connect to said pair of mounting lugs and provide for selective pivotal movement therebetween about a pivotal axis coincident with said pair of mounting lugs and said connector means; and a second portion having a pair of brackets to connect to said pair of further mounting lugs; wherein said brackets are adjustably mounted relative to each other to selectively vary the spacing therebetween and are adjustably mounted relative to said first portion to provide for selective displacement of said first portion in a direction parallel to a displacement axis coincident with said further mounting lugs and said brackets, and wherein each bracket is formed with an elongate arm portion of arcuate transverse section and a bracket portion extending outwardly therefrom, and said first portion has an interconnecting portion of complementary surface configuration to said arm portions to facilitate location and fixed interconnection between said first and second portions, whereby said arm portions are intimately disposed in a layered formation overlying said interconnecting portion, thereby defining outer and inner arm portions and said bracket portions are intended to intimately engage said further mounting lugs.

10. A mounting assembly as claimed at claim 9 wherein said arm portions are each provided with a centrally disposed elongate aperture, said apertures being axially aligned in said layered formation parallel to said displacement axis, and the first portion is provided with at least one threaded hole within said interconnecting portion to receive a retaining bolt, the arm portions being arranged to align the apertures thereof within said threaded hole to enable said retaining bolt to be received and secured therein, thereby fixing the first and second portions together, and further allowing relative slidable movement collectively or severally between said arm portions and said interconnecting portions parallel to said displacement axis, thereby enabling selective variation of the spacing between said bracket portions and selective displacement of said first portion relative to said other component parallel to said displacement axis.

11. A mounting assembly as claimed at claim 9 wherein said inner arm portion has an inner surface for engaging the adjacent surface of said interconnecting portion, of a lesser radius of curvature than said adjacent surface.

12. A mounting assemby as claimed at claim 9 wherein said outer arm portion has an inner surface for engaging the adjacent surface of said inner portion, of a lesser radius of curvature than said adjacent inner portion surface.

13. A mounting assembly as claimed at claim 9 wherein said inner arm portion has an inner surface for engaging the adjacent surface of said interconnecting portion, of a lesser radius of curvature than said adjacent surface, and said outer arm portion has an inner surface for engaging the adjacent surface of said inner portion, of a lesser radius of curvature than said adjacent inner portion surface.

14. A mounting assembly for mounting one component having a pair of mounting lugs of one spacing onto a pair of further mounting lugs of another component having a different standard spacing, comprising a first portion having connector means to connect to said pair of mounting lugs and provide for selective pivotal movement therebetween about a pivotal axis coincident with said pair of mounting lugs and said connector means; and a second portion having a pair of brackets to connect to said pair of further mounting lugs; wherein said brackets are adjustably mounted relative to each other to selectively vary the spacing therebetween and are adjustably mounted relative to said first portion to provide for selective displacement of said first portion in a direction parallel to a displacement axis coincident with said further mounting lugs and said brackets, and wherein said connector means is a spacing spindle of a length commensurate to said standard spacing to be receivable between said mounting lugs and having a hole at each end thereof axially aligned with said pivotal axis, the holes having threaded formations therein, each threaded hole being adapted to receive a corresponding mounting bolt for securement to said mounting lugs, whereby said one component may be selectively pivoted about said pivotal axis relative to said first portion and fixed at a particular location by tightening said bolts, said spindle maintaining the spacing between said mounting lugs.

15. A mounting assembly as claimed at claim 14 wherein said threaded formations are of opposite hand so that said spindle may be fixed in said mounting lugs such that pivotal movement of said one component in a prescribed direction is increasingly opposed by the tightening effect of said bolts.

16. A mounting assembly as claimed at claim 15 wherein each bracket is formed with an elongate arm portion of arcuate transverse section and a bracket portion extending outwardly therefrom, and said first portion having an interconnecting portion of complementary surface configuration to said arm portions to facilitate fixed interconnection between said first and second portions, whereby said arm portions are intimately disposed in a layered formation overlying said interconnecting portion, thereby defining outer and inner arm portions and said bracket portions are intended to intimately engage said further mounting lugs.

17. A mounting assembly as claimed at claim 16 wherein said arm portions are each provided with a centrally disposed elongate aperture, said apertures being axially aligned in said layered formation parallel to said displacement axis, and the first portion is provided with at least one threaded hole within said interconnecting portion to receive a retaining bolt, the arm portions being arranged to align the apertures thereof within said threaded hole to enable said retaining bolt to be received and secured therein, thereby fixing the first and second portions together, and further allowing relative slidable movement collectively or severally between said arm portions and said interconnecting portion parallel to said displacement axis, thereby enabling selective variation of the spacing between said bracket portions and selective displacement of said first portion relative to said other component parallel to said displacement axis.

18. A mounting assembly as claimed at claim 16 wherein said inner arm portions has an inner surface for engaging the adjacent surface of said interconnecting portion, of a lesser radius of curvature than said adjacent surface, and said outer arm portion has an inner surface, for engaging the adjacent surface of said inner portion, of a lesser radius of curvature than said inner portion surface.

19. A mounting assembly as claimed at claim 16 wherein said outer arm portion has an inner surface, for engaging the adjacent surface of said inner portion, of a lesser radius of curvature than said adjacent inner portion surface.

20. A mounting assembly as claimed at claim 16 wherein said inner arm portion has an inner surface for engaging the adjacent surface of said interconnecting portion, of a lesser radius of curvature than said adjacent surface.

21. A mounting assembly as claimed at claim 9 wherein said brackets are provided with a tubular spacing member commensurate in length to the spacing between said pair of further mounting lugs to be receivable therebetween, said spacing means having an axial hole therein to receive a fixing means for affixing said brackets to said further mounting lugs, thereby maintaining the spacing therebetween.

* * * * *